United States Patent [19]

Abbott

[11] 4,063,215
[45] Dec. 13, 1977

[54] HIGH FIDELITY LOW FREQUENCY TRANSDUCER FOR USE AT GREAT DEPTH

[75] Inventor: Frank R. Abbott, San Diego, Calif.

[73] Assignee: The United States of America as represented by the Secretary of the Navy, Washington, D.C.

[21] Appl. No.: 772,718

[22] Filed: Feb. 28, 1977

[51] Int. Cl.² .............................................. H04B 13/00
[52] U.S. Cl. .................. 340/8 LF; 340/7 R; 340/10
[58] Field of Search ............ 340/7, 8 R, 8 PC, 7 PC, 340/8 LF, 9, 1 Q

[56] References Cited

U.S. PATENT DOCUMENTS

| | | | |
|---|---|---|---|
| 2,717,369 | 9/1955 | Bardeen et al. | 340/8 LF |
| 2,791,757 | 5/1957 | Blake et al. | 340/7 R |
| 2,837,731 | 6/1958 | Harris | 340/7 R |
| 2,983,901 | 5/1961 | Paslay et al. | 340/8 LF |
| 3,432,000 | 3/1969 | Ongkiehong et al. | 340/7 R |
| 3,518,677 | 6/1970 | Florian | 340/7 R |

Primary Examiner—Harold Tudor
Attorney, Agent, or Firm—Richard S. Sciascia; Ervin F. Johnston; Thomas Glenn Keough

[57] ABSTRACT

A hose-like hydrophone array is insensitive to ambient pressure variations while retaining an acceptable performance capability. Ferroelectric cylinders mount rigid cylinders at opposite ends and are separated by elongate lengths of corrugated tubing. A dielectric oil fills the cylinders and lengths of corrugated tubing to make the array relatively insensitive to pressure variations. Since the dielectric oil is several times (five to 10) more compressible than the ambient water, the ferroelectric elements can more compliantly respond to a broader bandwidth of impinging or radiated acoustic energy. The radially rigid lengths of tubing hold a greater volume of the relatively compressible oil to permit this response.

3 Claims, 2 Drawing Figures

HIGH FIDELITY LOW FREQUENCY TRANSDUCER FOR USE AT GREAT DEPTH

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Hydrophone arrays are many and varied in design. A broadband linear response and increased sensitivity are goals long sought by designers and distinguish one model from another. For broadband transmission, and particularly, low frequency transmission, the radiation or absorption cross section of a transducer should be large for the transducer to exhibit a flat or uniform response. More specifically, the minimum or physical effective dimensions are preferably of the order of a half wave length at the lowest frequency. Such wave lengths for frequencies of 10 to 100 hertz lie between 500 and 50 feet in water and obviously, for such frequencies, the physical size becomes monstrous. One attempt at avoiding the otherwise required huge dimensions, manifests itself in this inventor's U.S. Pat. No. 3,718,897 which is entitled HIGH FIEDLITY UNDERWATER MUSIC PROJECTOR. This projector circumvents the need for the large physical dimensions by having a relatively high compliance. The contraction of the radiating surfaces under the incremental pressure of a sound wave is many times greater than for an equal volume of water. The cross-sectional area of the wave front distorted by the radiation surfaces may approach the square of a half wave length usually designated as the quantity, lamda squared over four. If the physical cross-sectional area is only a percent of this designation, then the volume compressibility must be about 100 times greater than the surrounding water. Under ideal electroacoustic matching and coupling conditions, the effective absorption cross-section may be 100's of times the actual cross-section. The U.S. Pat. No. 3,718,897 demonstrates a prime example of such a technique. The patented device along with a family of related structures are characterized by a low frequency resonance. At frequencies below this resonance, the structural elastic modulus reduces the compliance and the electroacoustic coupling is poor. At higher frequencies performance near the water's surface may be excellent. But the use of such a device at great depth is limited by a requirement for gaseous pressure compensation to prevent implosion or, at least, reduced response. Thus, it has been a common practice to revert to non-compliant sensors and to sometimes fill them with oil when operation at extreme depths is called for. This approach usually requires preamplifiers by each sensor to raise the signal voltage to a level consistent with losses inherent in transmitting the signal to a remote signal processor. The necessity of a preamplifier precludes the use of a hydrophone sensor as a projector of acoustic energy. This could be a serious handicap for certain applications call for the projection of an interrogation signal or to transmit information such as temperature or depth. Thus, there is a continuing need in the state-of-the-art for a pressure compensated sensor having the necessary compliance to assure reasonable effectiveness as a broadband linear acoustic energy receiver and projector.

SUMMARY OF THE INVENTION

The present invention is directed to providing an apparatus for ensuring the pressure compensated transfer of acoustic energy in a water medium. A means for generating signals representative of impinging acoustic energy is sandwiched between aligned rigid cylinders which provide a continuous rigid extension of the signal generating means. Elongate sections of radially incompressible corrugated tubing extend in axial alignment from the cylinders and all are filled with a dielectric oil. The longitudinal flexing capability of the sections of corrugated tubing is minimized by the length of the array which is not responsive to acoustic waves, to make the apparatus more compliant to give it a broadband capability irrespective of the ambient pressure. Any compliant volume near the sensor reduces the response. Thus, the corrugated tube must have axial compression suppressed. This is usually achieved by the extent of the array when a half wave length is exceeded.

It is an object of the invention to provide an improved transducer of acoustic energy.

Another object of the invention is to provide a transducer which is relatively insensitive to ambient pressure variations.

Still another object of the invention is to provide a transducer having a linear broadband operational characteristic.

A further object of the invention is to provide an elongate hose-like array being pressure compensated and adapted for broadband operation.

Still another object of the invention is to provide an elongate hydrophone array having a number of interspersed ferroelectric cylinders bracketed between rigid tubes and elongate sections of corrugated tubing.

These and other objects of the invention will become more readily apparent from the ensuing specification when taken with the drawings.

DESCRIPTION OF THE PREFERRED EMBODIMENT

Figure 1:
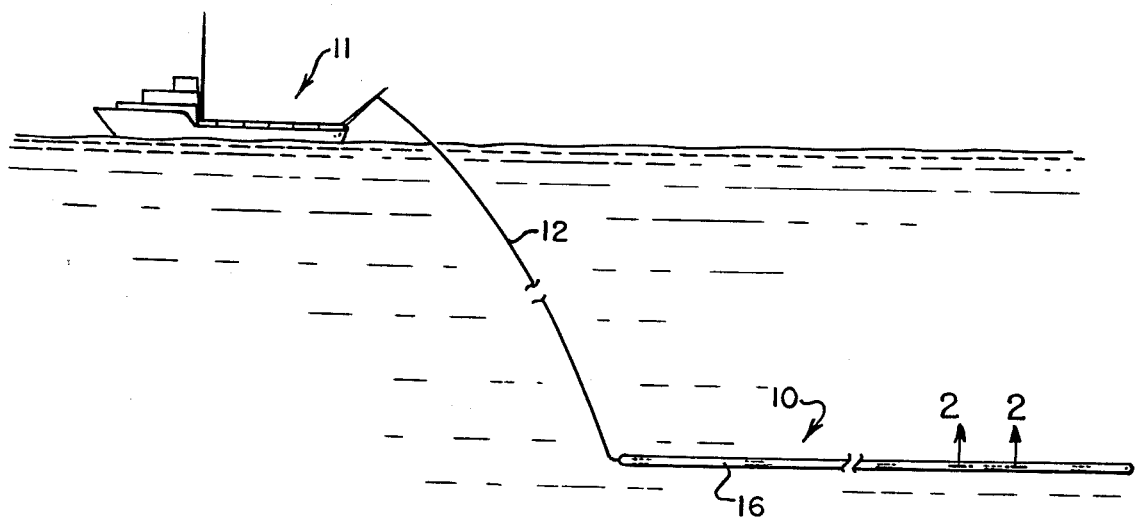
FIG. 1 is an isometric view of the invention operationally deployed.
Figure 2:
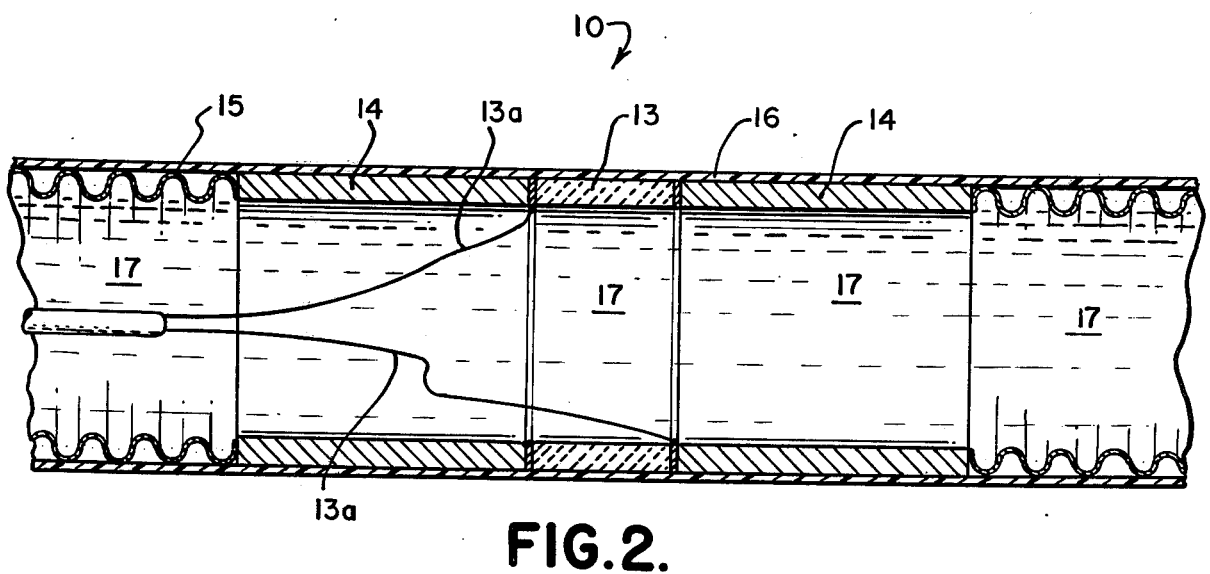
FIG. 2 is a cross-sectional view of one section of the invention taken generally along lines 2—2 in FIG. 1.

Referring to the drawings, a representative embodiment of a hydrophone array 10 is shown being towed through the water by a surface vessel 11 via a towing cable 12. Such arrays are in widespread use for monitoring seismic activity, detecting remote targets or for communication purposes. Since the arrays are deployed at extreme ocean depths, a need has risen to include some sort of a pressure compensation scheme to avoid damaging the transducer elements or otherwise rendering the array useless. Often with the conventional approaches of pressure compensation, pressure compensation sacrifices an array's acoustic compliance and, as a consequence, the bandwidth response is narrowed.

The hydrophone array of this invention can extend many hundreds of feet, depending upon the frequency range of interest. The array is made of a number of cylindrically-shaped ferroelectric elements 13 each having leads 13a coupled to opposite conductive faces and extending in a bundle to remote monitoring circuitry.

Hollow rigid cylindrical sections 14 are bonded or otherwise suitably connected to the opposite sides of each ferroelectric element and are substantially aligned with each ferroelectric element. The cylindrical sections are selected to have modulii which are higher than the ferroelectric cylinders to reduce the possiblity of damaging the array and to enhance its response.

Elongate sections of corrugated tubing 15 are placed in axial projections of the cylindrical sections, and are suitably secured to extend a distance which is at least a fourth to a half of the monitored or radiated wavelengths of interest. The corrugated tubing is fabricated to be relatively noncompressible for radial deformation yet is capable of flexure to permit storage of the array on reels.

A flexible sheath 16 encloses all of the elements of the hydrophone array. This structure lends water-tight integrity to the array as well as presenting a streamline shape to reduce the problems associated with flow noise as the array passes through the water.

A dielectric oil 17 fills the ferroelectric sections and rigid cylinders as well as the lengths of corrugated tubing. The dielectric oil has a compressibility which is several times the compressibility of the surrounding water. The specific oil used is a matter of choice. Caster oil could be selected as it was in U.S. Pat. No. 2,405,210 or U.S. Pat. No. 2,434,666 or U.S. Pat. No. 2,438,936 (which also substituted dimethyl phthalate or xylene hexafluride) or U.S. Pat. No. 2,404,391 (which also substituted olive oil or linseed oil) or the silicon fluid of U.S. Pat. No. 2,717,369. Impinging acoustic energy can, therefore, deform the ferroelectric elements and create signals which are fed by the leads to remote monitoring circuitry. Since the sections of corrugated tubing resist radial deformation, the ferroelectric cylinders of the array exhibit a much greater compliance and the array has a broader band response. This is because of the substantial volume of the dielectric oil contained in the lengths of corrugated tubing; the compliance of each ferroelectric element appears to be far more compliant to the impinging acoustic energy and representative signals are fed to the remote circuitry.

It has been determined that to be effective the lengths of each of the rigid cylinders be greater than the length of the sensor or ferroelectric element and that the length of each of the sections of corrugated tubing be approximately ten to one hundred times the length of each ferroelectric element. Thus, it is apparent that an array having twenty of the sections of the elements described above could extend many hundreds of feet for acceptable results.

Obviously, many modifications and variations of the present invention are possible in the light of the above teachings, and, it is therefore understood that within the scope of the disclosed inventive concept, the invention may be practiced otherwise than as specifically described.

What is claimed is:

1. An apparatus for ensuring the pressure compensated transfer of acoustic energy in a water medium comprising:

a number of ferroelectric cylinders having a polarization for generating signals representative of impinging acoustic energy when the impinging acoustic energy causes a radial deformation;

pairs of rigid cylinders mounted at opposite sides of each of the ferrroelectric cylinders in an aligned relationship for providing a continuous rigid extention thereof;

elongate corrugated tubes each having a length greatly in excess of the length of the ferroelectric cylinders and being substantially radially imcompressible, the corrugated tubes are coupled in an aligned relationship with the ferroelectric cylinders and rigid cylinders and are coupled at opposite ends of the rigid cylinders, the ferroelectric cylinders, rigid cylinders and corrugated tubes are all mutually aligned to form a streamlined elongate array;

means filling the ferroelectric cylinders, the rigid cylinders and the corrugated tubes for liquidly yielding in response to the impinging acoustic energy thereby permitting the generating means to generate the representative signals, the yielding means having a compressibility in excess of the surrounding water medium;

means coupled to the ferroelectric cylinders for feeding the representative signals to remote monitoring circuitry; and means for encasing the ferroelectric cylinders, the rigid cylinders, the elongate corrugated tubes and the yielding means and mounted thereabout to further provide a streamlined elongate array.

2. An apparatus according to claim 1 in which the liquidly yielding means is a dielectric oil having a compressibility in excess of the surrounding water medium.

3. An apparatus according to claim 2 in which the ferroelectric cylinders occupy a small percentage of the array as compared to the volume of the dielectric oil contained in the corrugated tubes to thereby increase the compliance of the array and, hence, extend its frequency response.

* * * * *